United States Patent [19]

Gendler et al.

[11] Patent Number: 4,478,687

[45] Date of Patent: Oct. 23, 1984

[54] PHENAZINE LEUCODYES FOR ELECTROCHROMIC RECORDING

[75] Inventors: Paul L. Gendler; Robert J. Twieg, both of San Jose, Calif.

[73] Assignee: International Business Machines Corporation, Armonk, N.Y.

[21] Appl. No.: 567,030

[22] Filed: Dec. 30, 1983

[51] Int. Cl.³ ............................................ G01D 15/06
[52] U.S. Cl. ...................................................... 204/2
[58] Field of Search ........................ 204/2; 346/135.1; 427/151

[56] References Cited

U.S. PATENT DOCUMENTS

| | | | |
|---|---|---|---|
| 4,211,616 | 7/1980 | Sambucetti | 204/2 |
| 4,309,255 | 1/1982 | Gendler | 204/2 |
| 4,374,001 | 2/1983 | Bernier | 204/2 |
| 4,439,280 | 3/1984 | Gendler | 204/2 |
| 4,443,302 | 4/1984 | Gendler | 204/2 |
| 4,444,626 | 4/1984 | Bernier | 204/2 |

FOREIGN PATENT DOCUMENTS 7352778  7/1973  Japan .................................... 204/2

*Primary Examiner*—Thomas Tufariello
*Attorney, Agent, or Firm*—Joseph G. Walsh

[57] ABSTRACT

Certain phenazine leucodyes are useful in electrochromic recording systems.

5 Claims, No Drawings

PHENAZINE LEUCODYES FOR ELECTROCHROMIC RECORDING

TECHNICAL FIELD

The present application is concerned with electrochromic recording. In particular, it is concerned with certain leucodyes for use in electrochromic recording systems.

BACKGROUND ART

Electrochromic recording per se is well known in the art. It is, for example, thoroughly discussed in U.S. Pat. No. 4,211,616 where operations of typical electrochromic systems are explained.

In U.S. patent application Ser. No. 426,478, now U.S. Pat. No. 4,439,280 the use of certain phenothiazine leucodyes is disclosed.

Japanese Pat. No. 73 52,778, abstracted in Chemical Abstracts Vol. 79, page 386, 1973, at page 137166, shows certain phenoxazine derivatives.

No prior art of which we are aware, however, discloses the use of the phenazine compounds of the present invention in electrochromic recording.

DISCLOSURE OF THE INVENTION

According to the present invention, an electrochromic recording system is provided by incorporating into an electrochromic recording substrate (such as paper) bromide ions and a leucodye having the structure

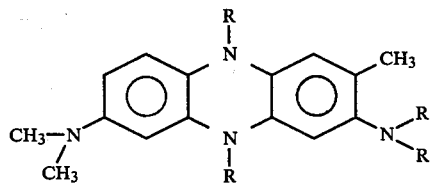

wherein R is an acyl group having from 1 to 6 carbon atoms.

Although in the past many leucodyes have been found that are very active electrochemically, virtually all of them suffer from undesirable ambient oxidation on the substrate, thereby producing very detrimental background coloration. The ideal dye for use in electrochromic recording must be stable in the colorless form under ambient conditions and, on the other hand, be capable of fast oxidation to the colored form, for example, upon exposure to bromine during the printing operation. The leucodyes of the present invention meet this requirement and produce a red-purple print with no background.

For use in an electrochromic recording process, a recording substrate such as paper is treated with one of the dyes of the present invention. The typical substrate, of course, is paper. In general, a standard 8½ by 11 inch page of paper of ordinary thickness would be treated with at least 10 mg of one of the leucodyes of the present invention. The FIG. 10 mg is in most cases close to a minimum figure and in general from 20 to 30 mg would usually be more preferable. The substrate, such as paper, is also treated to provide it with bromide ions. During the printing operation the bromide ions are converted to bromine which oxidizes the leucodyes to produce color.

The dyes of the present invention may be used alone or they may be mixed with each other. Alternatively, one or more of the dyes of the present invention may be mixed with other leucodyes so that additive combinations of colors may be obtained during the printing operation.

The dyes of the present invention have several advantages over the prior art. They have very great stability and intense color superior to the prior art, and in addition, they may be synthesized very easily from available inexpensive starting materials.

The most preferred compound of the present invention is the one in which R is propionyl. This compound is suprisingly soluble in organic solvents such as alcohol and acetone, so that the preparation of recording media is simplified.

The following procedures are given as preferred methods of synthesizing and using the most preferred material of the present invention. By analogous procedures, the other compounds of the present invention may also be prepared and used.

(1) 7-dimethylamino-5,10-dipropionyl-3-dipropionylamino-2-methyl-5,10-dihydrophenazine To a 500 ml round bottom 3-neck flask fitted with a stir bar, reflux condenser fitted with an argon inlet, was added neutral red (Aldrich, 5.00 g of 59% pure, or 10.24 mMol pure compound), xylene (250 ml, reagent), propionic anhydride (53 g-53 ml, 409 mMol, 40 equivalents), and pyridine (3.23 g-3.23 ml, 40 mMol, 4 equivalents). Zinc powder (2.66 g, 40.9 mMol, 4 equivalents) was added slowly to the stirred mixture and the mixture was placed in an oil bath maintained at 140°-145° and refluxed overnight. The reaction was cooled, diluted with ethyl acetate and washed with several portions of 25% ammonium hydroxide (2×250 ml) until the pH is 10-11. The organic layer was washed with water (3×40 ml), brine (1×150 ml), and dried (sodium sulfate). The residue on evaporation amounts to 5.75 g which after flash chromatography (system B) gives 3.90 g (81.5%) product. It can be recrystallized from ethanol/water to give material with the following properties: mp 198°-199°. TLC (A) 0.40. NMR(CDCl13) δ: 7.61 (s,1H); 7.29 (m,2H); 6.70 (m,1H); 2.97 (s,6H); 2.63 (m,8H); 2.13 (s,3H); 1.17 (m,12H).

(2) 7-dimethylamino-5,10-diacetyl-3-diacetylamino-2-methyl-5,10-dihydrophenazine In a like manner to (1), using acetic anhydride: mp 231°-234° d. TLC (ethyl acetate): 0.42. NMR(CDCl3) δ: 6.61 (s,1H); 7.26 (m,2H); 6.67 (m,1H); 2.97 (s,6H); 2.46 (s,3H); 2.36, 2.34 (s,s,6H total); 2.17 (s 6H). m/e: 422; 379; 337; 295; 277; 253; 237; 209; 105; 83.

EXAMPLE I

Ordinary paper (about 8½ inches by 11 inches) is coated with a composition containing an aqueous composition of about 9% by weight of potassium bromide and about 1.4% by weight of potassium dihydrogen phosphate. The composition is filtered and sprayed onto ordinary paper. After drying, the paper is then coated with a solution of about 1-2% by weight of TPNR in acetone to provide about 10-20 milligrams of the leucodye per page. The paper is then subjected to electrolytic printing apparatus. Indicia are then electrolytically printed on the paper by applying in a predetermined voltage pattern of about 15 volts predetermined voltage pattern of about 15 volts thereacross. The pulse time is about 700 microseconds. The electrode employed is about 10 mils wide and about 4 milliamps of current are employed. The color of the printed indicia is red purple.

We claim:

1. A substrate for electrochromic recording comprising bromide ions and characterized by also comprising a leucodye having the structure

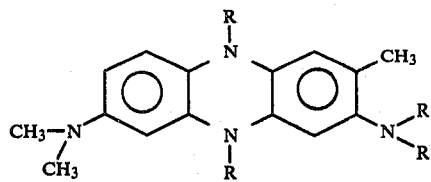

wherein R is an acyl group having from 1 to 6 carbon atoms.

2. A substrate as claimed in claim 1 wherein R is a propionyl group.

3. A substrate as claimed in claim 1 wherein the leucodye is admixed with another leucodye.

4. A substrate as claimed in claim 1 wherein the substrate is paper.

5. A substrate as claimed in claim 4 wherein the leucodye is present at a concentration of about 20 mg per standard paper page of 8½ by 11 inches.

* * * * *